United States Patent
Phelps et al.

(10) Patent No.: US 6,689,060 B2
(45) Date of Patent: Feb. 10, 2004

(54) SYSTEM AND METHOD FOR RE-ORDERABLE NONLINEAR ECHO PROCESSING

(75) Inventors: Robert N. Phelps, Issaquah, WA (US); Hong Wang, Bellevue, WA (US); Zoran B. Banjanin, Newcastle, WA (US); Paul T. Kuhn, Issaquah, WA (US)

(73) Assignee: Siemens Medical Solutions USA, INC, Malvern, PA (US)

( * ) Notice: Subject to any disclaimer, the term of this patent is extended or adjusted under 35 U.S.C. 154(b) by 0 days.

(21) Appl. No.: 09/797,213

(22) Filed: Feb. 28, 2001

(65) Prior Publication Data

US 2002/0165451 A1 Nov. 7, 2002

(51) Int. Cl.$^7$ ................................. A61B 8/00
(52) U.S. Cl. ................... 600/437; 365/230.02
(58) Field of Search ................. 600/437–472

(56) References Cited

U.S. PATENT DOCUMENTS

| | | | | | |
|---|---|---|---|---|---|
| 5,158,088 A | * | 10/1992 | Nelson et al. | ............... | 600/461 |
| 5,175,838 A | * | 12/1992 | Kimura et al. | ............... | 711/154 |
| 5,424,981 A | * | 6/1995 | Kimura et al. | ......... | 365/189.01 |
| 5,450,342 A | * | 9/1995 | Kimura et al. | ......... | 365/189.01 |
| 5,492,125 A | * | 2/1996 | Kim et al. | ................ | 600/443 |
| 5,528,302 A | * | 6/1996 | Basoglu et al. | ............. | 348/442 |
| 5,642,732 A | * | 7/1997 | Wang | .................... | 600/453 |
| 5,788,635 A | * | 8/1998 | Wright et al. | ............... | 600/437 |
| 5,910,117 A | * | 6/1999 | Basoglu et al. | ............. | 600/454 |
| 5,961,461 A | * | 10/1999 | Mo et al. | .................... | 600/443 |
| 6,262,749 B1 | * | 7/2001 | Finger et al. | ............... | 345/564 |
| 6,347,344 B1 | * | 2/2002 | Baker et al. | .................. | 710/20 |
| 6,417,857 B2 | * | 7/2002 | Finger et al. | ............... | 345/505 |
| 6,434,649 B1 | * | 8/2002 | Baker et al. | ................ | 710/107 |

* cited by examiner

*Primary Examiner*—Marvin M. Lateef
*Assistant Examiner*—William C. Jung

(57) ABSTRACT

An image processing system according to an implementation of the invention includes a plurality of signal processing modules (210, 212, 214, 216, 218, 220, 222, 224, 226) inline in a data stream receiving signals. The signal processing modules include input multiplexers (234a–234i) adapted to control an order of or bypassing of processing by the signal processing modules. The signal processing modules may be implemented as hardware-based, nonlinear signal processing modules, such as log compress, decimation, compounding, blending, edge enhancement, automatic gain control, BHNS, lateral, or persistence filters.

23 Claims, 2 Drawing Sheets

US 6,689,060 B2

SYSTEM AND METHOD FOR RE-ORDERABLE NONLINEAR ECHO PROCESSING

BACKGROUND OF THE INVENTION

1. Field of the Invention

The present invention relates to ultrasound systems and, in particular, an improved system and method for nonlinear echo processing.

2. Description of the Related Art

Techniques of nonlinear signal processing are known to provide significant benefits in imaging systems, such as ultrasound imaging systems. One method of implementing such techniques is through use of digital signal processors. However, nonlinear signal processing techniques tend to be relatively computationally-intensive. Consequently, in many cases, nonlinear processing is implemented in hardware, in application specific integrated circuits (ASICs).

It is often desirable to implement more than one type of type of nonlinear signal processing. In such cases, the order of processing can be important in ultimately determining the quality of the image. As can be appreciated, hardware or ASIC-based techniques are relatively inflexible and can be expensive. That is, much simulation of such systems is required prior to the development of the system. Even with such simulation, however, the hardware or ASIC may need to be redesigned or reworked to achieve the optimal result. Moreover, any change after development can be met only with a new release of the product.

As such, there is a need for an improved system and method for nonlinear signal processing.

SUMMARY OF THE INVENTION

These and other problems in the prior art are overcome in large part by a system and method according to the present invention. An ultrasound system according to one implementation of the invention includes transmit and receive circuitry for transmitting and receiving ultrasound signals; and a plurality of signal processing modules inline in a data stream receiving the ultrasound signals. The signal processing modules include input multiplexers adapted to control an order of processing by the plurality of signal processing modules. The inline signal processing modules may be bypassed by the use of the multiplexers, as well. Further, the signal processing modules may be implemented as hardware-based nonlinear signal processing modules.

An image processing system according to an implementation of the invention includes a plurality of signal processing modules inline in a data stream receiving signals. The signal processing modules include input multiplexers adapted to control an order of or bypassing of processing by the signal processing modules. The signal processing modules may be implemented as hardware-based, nonlinear signal processing modules, such as log compress, decimation, compounding, blending, edge enhancement, automatic gain control, black hole noise spike, lateral, or persistence filters.

BRIEF DESCRIPTION OF THE DRAWINGS

A better understanding of the invention is obtained when the following detailed description is considered in conjunction with the following drawings in which.

DETAILED DESCRIPTION OF THE INVENTION

FIGS. 1–4 illustrate an improved system and method for echo processing. An ultrasound system according to one implementation of the invention includes transmit and receive circuitry for transmitting and receiving ultrasound signals; and a plurality of signal processing modules inline in a data stream receiving the ultrasound signals. The signal processing modules include input multiplexers adapted to control an order of processing by the plurality of signal processing modules. The inline signal processing modules may be bypassed by the use of the multiplexers, as well. Further, the signal processing modules may be implemented as hardware-based nonlinear signal processing modules.

Figure 1:
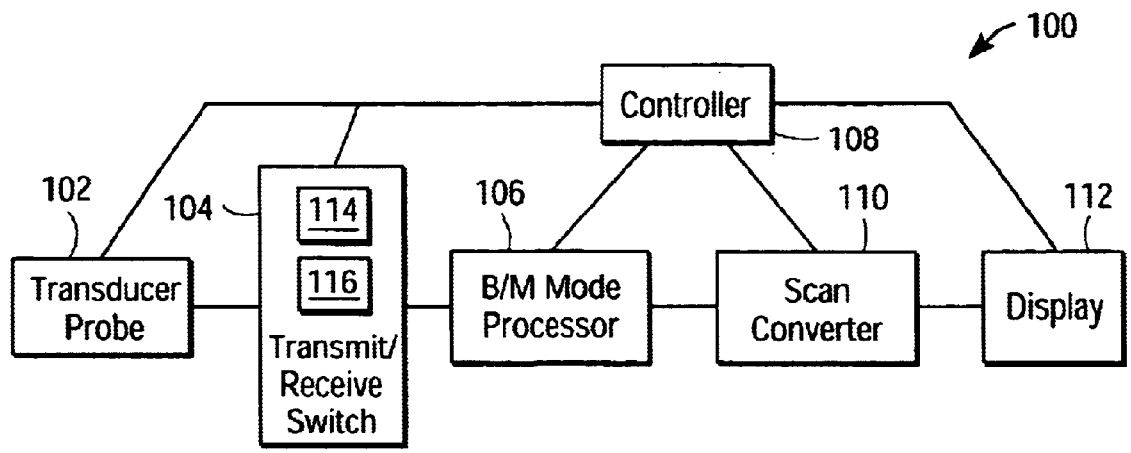
FIG. 1 is a block diagram of an ultrasound system according to an implementation of the invention.
Figure 3:
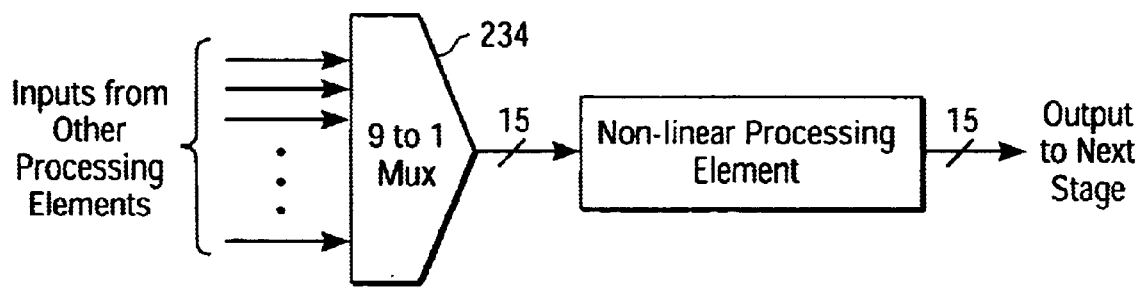
FIG. 3 is a diagram of a multiplexer nonlinear processor pair according to an implementation of the invention.

Turning now to FIG. 1, a block diagram of an ultrasound imaging system according to an embodiment of the present invention is illustrated. Ultrasound systems suitable for use with the teachings of the present invention are well known. One such system is the Elegra, available from Siemens Ultrasound, Inc., Issaquah, Wash.

The ultrasound imaging system 100 of FIG. 1 includes a transducer probe 102 configured to radiate and receive ultrasound waves. The transducer probe 102 is coupled to a transmit/receive circuit 104 and a BIM mode processor 106. The B/M mode processor processes both B and M mode vectors. The B/M mode processor 106 is coupled to a scan converter 110, which provides an output to a display device 112. A controller 108 is further coupled to control the various devices. It is noted that, while the various functions are illustrated as being implemented as discrete hardware components, they may be implemented in varying degrees of integration as ASICs or microprocessors, or software. Thus, FIG. 1 is exemplary only.

As shown, the transmit/receive circuit 104 includes a gated oscillator 114 and a gated receiver 116. The system controller 108 provides a user interface (e.g., control panel, display menu, keyboard and the like) (not shown) and generally controls system operations. In operation, the system controller 108 triggers the gated oscillator 114 to generate electrical signals for output to the transducer probe 102. The transducer probe 102 converts the electrical signals into an ultrasound transmit pattern.

Typically, the transducer is positioned adjacent to and in contact with a patient's anatomy. The transmit pulse wave pattern propagates into the patient's anatomy where it is refracted, absorbed, dispersed and reflected. The signal components which are reflected back to the transducer probe 102 are sensed and converted back into electrical signals. The signals are then input to the receiver 116 which amplifies the signals.

The B and M mode signals are transferred to the B/M mode processor 106 which is described in greater detail below. The output from the B/M mode processor 106 is then provided to a scan converter 110. The scan converter 110 is provided because the received signals are in a vector domain or polar coordinates, whereas the display device is in raster domain or rectangular coordinates. The scan converter 110 thus converts the received polar coordinate image into raster coordinate display and interpolates outputs for those raster pixel locations which do not exactly coincide with the received vector points. The scan converter 110 outputs the image to a display device 112.

Figure 2:
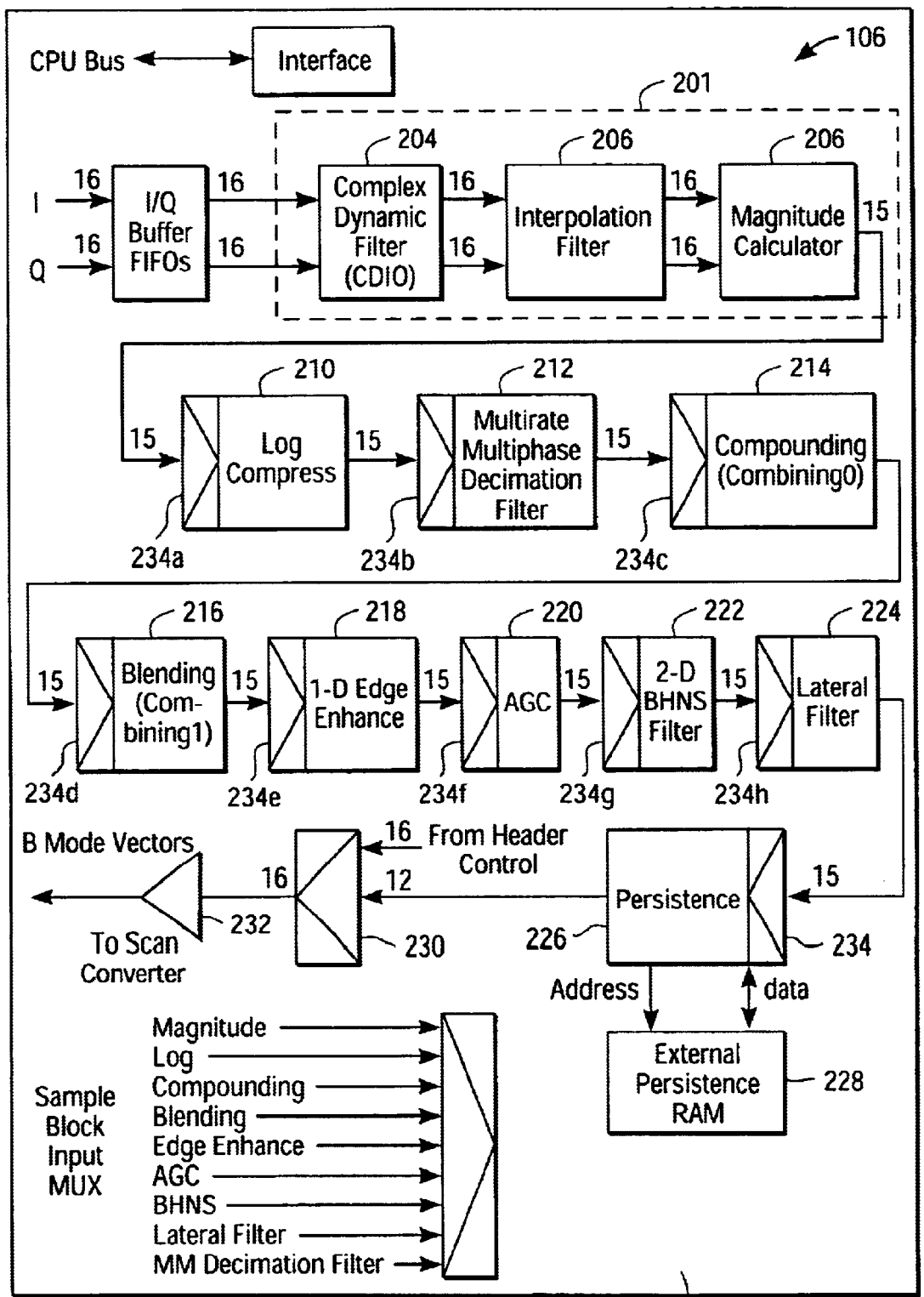
FIG. 2 is a block diagram of a nonlinear signal processor according to an implementation of the invention.

According to an implementation of the present invention, the B/M mode processor 106 includes a plurality of reorderable signal processing modules. Turning now to FIG. 2, a block diagram of the B/M mode processor 106 is shown in greater detail. As shown, in phase and quadrature echo signals are received into I/Q buffers 202. The data signals are then provided to a linear signal processing block 201. The linear signal processing block 201 may include a complex dynamic filter 204, an interpolation filter 206, and a magnitude calculator 206. The data signals are then provided to a nonlinear signal processing block 203. As shown, the nonlinear signal processing block 203 includes a plurality of nonlinear signal processing modules 210, 212, 214, 216, 218, 220, 222, 224, and 226. In the implementation illustrated, the nonlinear signal processing modules include log compress 210, multiphase multirate decimation 212, compounding 214, blending 216, edge enhancement 218, automatic gain control 220, two dimensional black hole noise removal 222, lateral 224, and persistence filters 226. Also included are an external persistence RAM 228, a multiplexer 230, and an output buffer 232. It is noted that in alternate implementations, other, more or fewer nonlinear signal processing modules may be provided. Further, the nonlinear signal processing modules may be provided in differing orders. Thus, the figures are exemplary only. Details on exemplary specific filters are provided in the attached Appendix.

The nonlinear signal processing modules each include an input multiplexer 234a–234i. In the implementation illustrated, the input multiplexers 234a–234i are 9-to-1 multiplexers, where nine (9) is the number of nonlinear signal processing modules it may be desired to be re-ordered. A multiplexer-processing module pair is shown in greater detail in FIG. 3. As shown, the pair includes a 9-to-1 multiplexer and a nonlinear signal processing element.

Figure 4:
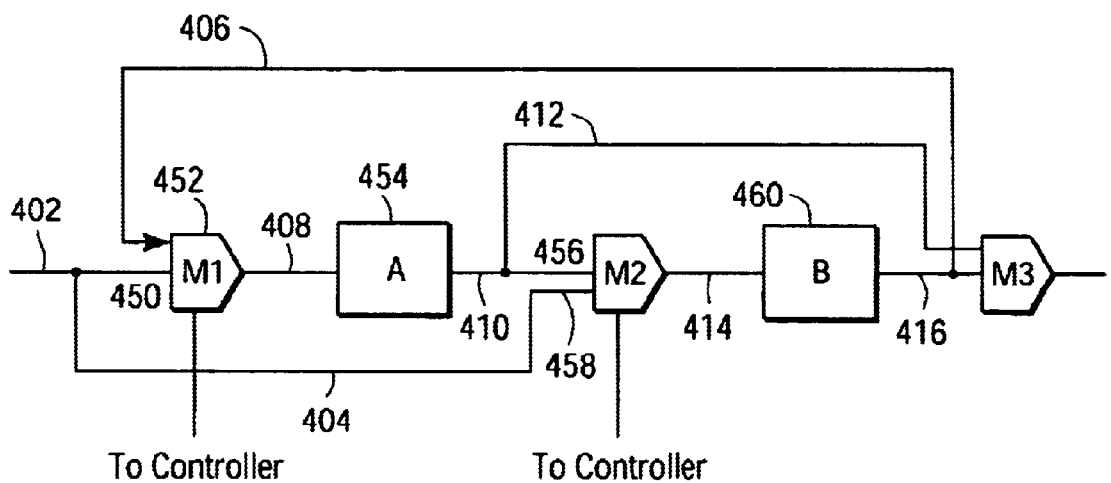
FIG. 4 is a diagram schematically illustrating operation of an implementation of the invention.

Turning now to FIG. 4, a diagram illustrating operation of an implementation of the invention is schematically illustrated. For convenience, only two signal processing modules A, B, and three input multiplexers M1, M2, M3 are shown. The multiplexer M1 includes inputs 450, 452; the multiplexer M2 includes inputs 456, 458. The nonlinear signal processing module A includes an input 454; the nonlinear signal processing module B includes an input 460. Data are input along line 402 to the input 450 of multiplexer M1 and via line 404 to the input 458 of multiplexer M2. The output of the multiplexer M1 couples via line 408 to the input 454 of the nonlinear signal processing module A. The output of the nonlinear signal processing module A couples via line 410 to the input 456 of the multiplexer M2, as well as to the input of the multiplexer M3 via line 412. The output of the multiplexer M2 couples via line 414 to the input 460 of the nonlinear signal processing module B. Finally, the output of the nonlinear signal processing module B couples via line 406 to the input 452 of the multiplexer M1.

In operation, the controller 108 (e.g., FIG. 1) controls the select inputs of the multiplexers M1, M2. Thus, the controller 108 selects whether the nonlinear processing module A or the nonlinear processing module B processes the signal stream first. The controller 108 is programmable by the user in a known manner to select which of the nonlinear signal processing modules is first in the chain.

If the nonlinear signal processing module A is to process the signal first, then controller controls operation of the multplexers M1, M2 such that the data are provided along line 402 to the input 450 of multiplexer M1, pass the multiplexer 450 input to nonlinear signal processing block A. The output of the nonlinear signal processing block A is provided to the input 456 of the multplexer M2. The multiplexer M2 passes the signal to the nonlinear signal processing block B.

Similarly, if the nonlinear signal processing block B is to operate on the signal first, then the controller controls operation of the multiplexers M1, M2 such that the input 450 of multiplexer M1 is blocked, and the input 456 of the multiplexer M2 is blocked. Thus, the signal is received along line 402 and passes aloing line 404 to the input 458 of the multiplexer M2. The multiplexer M2 passes the signal along line 414 to the nonlinear signal processing block B. The signal is processed by the nonlinear signal processing block B and passes along line 406 to the input 452 of the multiplexer M1. The multiplexer M1 then passes the signal to the nonlinear signal processing block A. The nonlinear signal processing block A processes the signal and outputs it on line 410. The signal does not enter multiplexer M2, but passes on line 412 to the next multiplexer M3.

The invention described in the above detailed description is not intended to be limited to the specific form set forth herein, but on the contrary, it is intended to cover such alternatives, modifications and equivalents as can reasonably be included within the spirit and scope of the appended claims.

APPENDIX

COMPLEX DYNAMIC FILTERING

The incoming I and Q data will be processed with a Complex Dynamic Filter. This filter is subdivided into four unique functions which include:

I/Q buffer FIFOs.

multi-tap Complex, Dynamic, Multirate Filter.

Interpolation Filter.

I/Q Buffer FIFOs

Due to the decimation of the complex filter the output data rate can be greatly reduced from the input rate. Thus the input data needs to be buffered. To perform this a double buffered pair of 1024 word FIFOs are used. Once one set is loaded, filtering can begin and the other set is loaded in the background.

COMPLEX FILTER

Filter parameters are as follows:

| Filter Parameters | |
|---|---|
| Input Rate | Up to 40 MHz |
| Output Rate | Input Rate / Decimation Rate |
| Decimation Rate | 1 to 8 in integer increments |
| Internal Filter Blocks | 4 (for I, Q, (I to Q) and (Q to I)) |

INTERPOLATION FILTER

Fixed filter used to interpolate between complex filter output data. Used for complex output rates of 20 MHz or less. This filter simplifies the complex decimation filter and reduces artifacts caused by non-linear processing.

MAGNITUDE CALCULATION

The system will find the magnitude of the filtered I and Q data. This is done by simply squaring I and Q, adding them together and taking the square root.

LOG COMPRESSION

The log compression block will implement the following transfer function $$Y = Y_{max} \cdot \frac{\log(gX/q)}{\log(X_{max}/q)}$$

where g=Log gain

X=Input to Log compressor:

$X_{max}$=Maximum input value q=Dynamic range control parameter defined as $$q = \frac{X_{max}}{10^{DB/20}}$$

Y=Log compressor output $Y_{max}$=Maximum output value

DB in the above equation represents the compression dynamic range in dB. For example, if dynamic range of 30 dB is selected, DB will be set to 30.

The Log block shall be designed to realize the transfer function described above and meet the following requirements:

Log conversion error:
>Error fluctuation should not be greater than 1 bit.

Range of DB 90~30:

All inputs to the log compression block are programmable to allow for flexibility.

The processor shall have the ability to combine up to four interleaved vectors at one time with as many as 16 focal zones. There are two identical blocks in the device which may be programmed to perform either blending or compounding. These blocks are referred to as Combining0 and Combining1.

MULTIRATE, MULTIPHASE DECIMATION FILTER

This filter is used for the purpose of adjustment of number of range gates.

Filter parameters are as follows:

| Multirate, Multiphase Filter Parameters | |
|---|---|
| Input Rate | Up to 40 MHz |
| Output Rate | Input Rate / Decimation Rate |
| Decimation Rate | 1 to 4 in 0.125 increments |
| Phases | 8 |
| Internal Filter Blocks | 1 |

FOCAL ZONE BLENDING (COMBINING)

The processor shall have the ability to blend interleaved vectors with as many as 16 focal zones. The blending process is a range dependent, weighted sum of multiple vectors collected along the same vector line. In general, the transmit focus depth is different for each of the summed vectors. By combining these vectors, a single vector with multiple transmit foci can be achieved. Blending does lower the effective frame rate. The $C_m(n)$'s for each depth will add to one. This will negate the need for any gain circuitry on the output of this functional block. Multiple buffers are used to blend as many as 16 interleaved focal zones.

Each focal zone will have a start and stop register to specify where it is stored in the buffers.

The following equation is used for blending.

$$B(n) = \sum_{m=0}^{M-1} V_m(n) C_m(n)$$

where n=depth index m=focal depth index

M=total number of transmit focal depths $V_m(n)$=vector data for m'th transmit focal depth $C_m(n)$=weighting coefficient for m'th vector B(n)=blended output vector

| Focal Zone Blending and Compounding Parameters | |
|---|---|
| Number of tables | 1 for each focal zone |
| Number of focal zones | 16 maximum |

COMPOUNDING

The processor shall have the ability to compound interleaved vectors with as many as 16 focal zones. Compounding is identical to blending with the following additional features:

$$Y(n) = \text{Max}(V_m(n)C_m(n)) \text{ For } m=0 \text{ to } M-1$$

and $$Y(n) = \text{Min}(V_m(n)C_m(n)) \text{ For } m=0 \text{ to } M-1$$

where:

n=depth index m=focal depth index

M=Total number of compounding components $V_m(n)$=vector data for m'th transmit focal depth $C_m(n)$=weighting coefficient for m'th vector Y(n)=compounded output vector The blending and compounding share the same buffers and 16 coefficient weight tables. These memories are allocated to one block or the other.

EDGE ENHANCEMENT

The edge enhancement filter is used to emphasize the high frequency component of the detected echo signal in the axial direction. This results in an increased emphasis of the tissue boundaries. The filter can be selected on a vector to vector basis (by the type of vector) from an available set of filters stored in the processor. The output of the AEE filter will always be positive. Should a negative number be detected, that output sample will be forced to zero. An overflow result will be clamped to the maximum value.

AGC

Auto Gain Control (AGC) reduces gains to avoid saturation when strong echo signal is received. Circuit integrates output signals and reduces gains of excess of bias level by negative feedback to reinforce edges.

Functions
  Output signal limit processing.
  Integration after the lower level bias of the display and the upper level limit through the first LPF.
  Feedback gain processing after integration.
  Bias processing after feedback gain.
  Negative signal limit processing after bias.
  Negative feedback delay processing to input signal after negative signal limit.

BLACK HOLE AND NOISE SPIKE FILLING

Grey scale images display a characteristic speckle pattern which naturally contain null regions which appear as dark areas or black holes on the display. This problem can be alleviated through the use of black hole filling which fills in the nulls to reduce the brightness change as a vector transverses a null. The BHF and NSF use different logic to determine if a sample should be replaced and by what value. BHFINSF will be done in 1-D and 2-D mode.

Filtering is a two step process, first the black hole and noise spike sections determine if a sample should be replaced according to the algorithms shown below. The result is a replacements value and a flag indicating if the value is other than the current unchanged sample. This is the center word of the 3 by 3 filter kernel. Next, the two flag bits are used as an address to select 3 bits from a 4 by 3 bit LUT. The three bits are used to select one of five sources for the final output from the filter.

All internal calculations will clamp to zero if the result is negative and to maximum if overflow.

FIG. 1
Black Hole Filter kernel

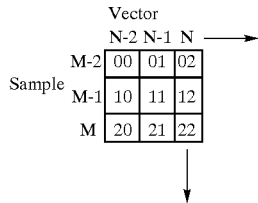

BLACK HOLE FILLING ALGORITHM

One Dimensional Black Hole Filtering (BHF2D=0)

$$g_{n,m} \rightarrow \begin{cases} \uparrow & g_{n,m} \quad \text{if } f_b \; 0 \\ \downarrow & \Delta g_{n,m} \; (1 \; \Delta)h_{n,m} \quad \text{if } f_b \; 1 \end{cases}$$

where, n is for axial index and m is for lateral index, and $$f_b \rightarrow \begin{cases} \uparrow & 0, \text{ if } g_{n,m} \tau h_{n,m} \\ \downarrow & 1, \text{ otherwise} \end{cases}$$

and $$h_{n,m} = \begin{cases} \dfrac{g_{n-1,m} + g_{n+1,m}}{2} - t_a & \text{(A) Axial Average Only} \\ \text{if } AxialLateralSel = 1, AxialLateralAverage = 1 \\ \dfrac{g_{n,m-1} + g_{n,m+1}}{2} - t_l & \text{(B) Lateral Average Only} \\ \text{if } AxialLateralSel = 0, AxialLateralAverage = 1 \\ \min(g_{n-1,m} - t_a, g_{n+1,m} - t_a) & \text{(C) Axial Only} \\ \text{if } AxialLateralSel = 1, AxialLateralAverage = 0 \\ \min(g_{n,m-1} - t_l, g_{n,m+1} - t_l) & \text{(D) Lateral Only} \\ \text{if } AxialLateralSel = 0, AxialLateralAverage = 0 \end{cases}$$

$t_d$ is the axial black hole filter threshold value, $t_l$ is for lateral threshold value, n is depth index, m is vector index, and g(n,m) is the sample value. Equations above can be used for the one dimensional filtering.

Black Hole Filtering Example

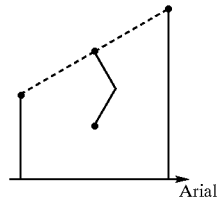

(A)

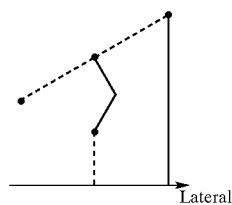

(B)

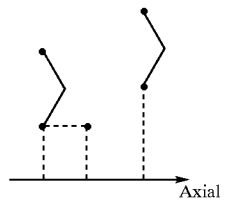

(C)

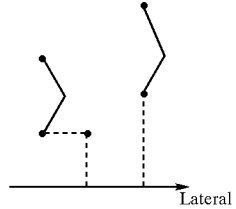

(D)

Two Dimensional Black Hole Filtering (BHF2D=1)

$$g_{n,m} \rightarrow \begin{cases} \uparrow & g_{n,m} \quad \text{if } f_b \; 0 \\ \downarrow & \Delta g_{n,m} \; (1 \; \Delta)h_{n,m} \quad \text{if } f_b \; 1 \end{cases}$$

where, n is for axial index and m is for lateral index, and $$f_b \to \begin{cases} 0 & \text{if } g_{n,m} \tau h_{n,m} \\ 1 & \text{otherwise} \end{cases}$$

and $$h_{n,m} = \begin{cases} \dfrac{g_{n-1,m} + g_{n+1,m} + g_{n,m-1} + g_{n,m+1}}{4} - t_{al} & (A)\ (2D\ Processing) \\ \quad \text{if } 2DAverage = 1 \\ \min\left(\dfrac{g_{n-1,m} + g_{n+1,m}}{2} - t_a, \dfrac{g_{n,m-1} + g_{n,m+1}}{2} - t_l\right) & (B)\ (Less\ Axial\ \&\ Lateral) \\ \quad \text{if } 2DAverage = 0, AxialLateralAverage = 1, MinMaxSel = 1 \\ \max\left(\dfrac{g_{n-1,m} + g_{n+1,m}}{2} - t_a, \dfrac{g_{n,m-1} + g_{n,m+1}}{2} - t_l\right) & (C)\ (More\ Axial\ \&\ Lateral) \\ \quad \text{if } 2DAverage = 0, AxialLateralAverage = 1, MinMaxSel = 0 \\ \min(\min(g_{n-1,m} - t_a, g_{n+1,m} - t_a), \min(g_{n,m-1} - t_l, g_{n,m+1} - t_l)) & (D)\ (Less) \\ \quad \text{if } 2DAverage = 0, AxialLateralAverage = 0, MinMaxSel = 1 \\ \max(\min(g_{n-1,m} - t_a, g_{n+1,m} - t_a), \min(g_{n,m-1} - t_l, g_{n,m+1} - t_l)) & (E)\ (More) \\ \quad \text{if } 2DAverage = 0, AxialLateralAverage = 0, MinMaxSel = 0 \end{cases}$$

Note, MinMaxSel can be the same bit as AxialLateralSel for 1D.

NOISE SPIKE FILTERING

Greyscale images always have random noise components, which are often noticeable where the signal levels are low, such as in anechoic cystic regions. The NSF shall provide a means of suppressing high amplitude noise spikes by using lateral neighbors to identify isolated noise spikes and compute the fill-in value.

One Dimensional Noise Spike Filtering for B Mode (NSF2D=0)

$$g_{n,m} \to \begin{cases} g_{n,m} & \text{if } f_n\ 0 \\ \Delta g_{n,m}\ (1\ \Delta)h_{n,m} & \text{if } f_n\ 1 \end{cases}$$

where $$f_b \to \begin{cases} 0, & \text{if } g_{n,m} \delta h_{n,m} \\ 1, & \text{otherwise} \end{cases}$$

and $$h_{n,m} = \begin{cases} \max(g_{n-1,m}, g_{n+1,m}) + t_a & (A)\ Axial\ Only \\ \quad \text{if } AxialLateralSel = 1 \\ \max(g_{n,m-1}, g_{n,m+1}) + t_l & (B)\ Lateral\ Only \\ \quad \text{if } AxialLateralSel = 0 \end{cases}$$

$t_a$ is the NSF threshold in the axial dimension and $t_l$ is the threshold in the lateral dimension, n is the depth index, m in the vector index, and g(n,m) is the n'th sample of the m'th vector.

NOISE SPIKE FILTERING EXAMPLE

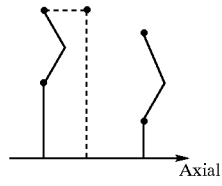

(A)

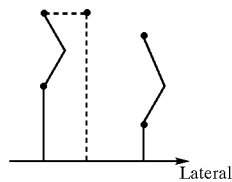

(B)

Two Dimensional Noise Spike Filtering (NSF2D=1)

$$g_{n,m} \to \begin{cases} g_{n,m} & \text{if } f_n\ 0 \\ \Delta g_{n,m}\ (1\ \Delta)h_{n,m} & \text{if } f_n\ 1 \end{cases}$$

where $$f_b \to \begin{cases} 0, & \text{if } g_{n,m} \delta h_{n,m} \\ 1, & \text{otherwise} \end{cases}$$

and $$h_{n,m} = \begin{cases} \min(\max(g_{n-1,m}, g_{n-1,m}) + t_n, \max(g_{n,m-1}, g_{n,m-1}) + t_l) & (A)\ (More) \\ \quad \text{if } MinMaxSel = 1 \\ \max(\max(g_{n-1,m}, g_{n+1,m}) + t_n, \max(g_{n,m-1}, g_{n,m+1}) + t_l) & (B)\ (Less) \\ \quad \text{if } MinMaxSel = 0 \end{cases}$$

with the variables defined as in the previous section.

BHF/NSF OUTPUT SELECTION

| Code | Selection |
|---|---|
| 0 | Current value |
| 1 | Black hole replacement |
| 2 | Noise spike replacement |
| 3 | max(hole/noise replacement) |
| 4 | min(hole/noise replacement) |

If the filter is to be switched from filtering to non-filtering mode, a delay must be inserted to allow the filter to flush it's buffers.

LATERAL FILTER

This filter is a multi tap filter in the lateral direction. It can be used as a smoothing or edge enhancement function. Four sets of coefficients, gain, and scale values are available and selected by two bits for each vector.

When programmed as an N tap filter, N vectors are needed for processing. The first (N−1)/2 incoming vectors will be stored and passed through the filter as the next (N−1)/2 vectors are received. Once the next vector is received processing will start and will continue for all vectors until the filter is told that it has received the last vector. After that vector is processed the filter will flush the remaining (N−1)/2 vectors.

Further details on lateral filtering are obtained from U.S. patent application Ser. No. 09/606,494 filed Jun. 29, 2000, which is hereby incorporated by reference in its entirety as if fully set forth herein.

PERSISTENCE

Echo persistence is a process wherein the output vector for a given vector index is a linear combination of the previous output vector at that index and the new input vector at that same index. The amount of persistence is a function of the difference between the new sample and the previous sample for the same vector index and depth. The Persistence algorithm is as follows:

$$V_{out}(k,m,n) \, a \upsilon V_{out}(k\,1,m,n) \, (1\,a) \upsilon V_{in}(k,m,n)$$

where k=acoustic frame index m=vector index n=depth index

Vout(k,m,n)=k'th output of the n'th depth of the m'th vector index

Vin(k,m,n)=k'th input for the n'th depth of the m'th vector index a=the persistence value, a real number between 0 and 1

What is claimed is:

1. An ultrasound system, comprising:

transmit and receive circuitry for transmitting and receiving ultrasound signals; and a plurality of signal processing modules inline in a data stream receiving said ultrasound signals, said signal processing modules including input multiplexers adapted to control an order of processing by said plurality of signal processing modules.

2. An ultrasound system in accordance with claim 1, said input multiplexers comprising bypass multiplexers for bypassing one or more of said signal processing modules.

3. An ultrasound system in accordance with claim 2, said signal processing modules comprising nonlinear signal processing modules.

4. An ultrasound system in accordance with claim 3, said nonlinear signal processing modules including at least one of log compress, decimation, compounding, blending, edge enhancement, automatic gain control, BHNS, lateral, or persistence filters.

5. An image processing system, comprising: a plurality of signal processing modules inline in a data stream receiving signals, said signal processing modules including input multiplexers adapted to control an order of processing by said plurality of signal processing modules.

6. An image processing system in accordance with claim 5, said input multiplexers comprising bypass multiplexers for bypassing one or more of said signal processing modules.

7. An imaging system in accordance with claim 6, said signal processing modules comprising nonlinear signal processing modules.

8. An imaging system in accordance with claim 7, said nonlinear signal processing modules including at least one of log compress, decimation, compounding, blending, edge enhancement, automatic gain control, BHNS, lateral, or persistence filters.

9. An imaging system in accordance with claim 5, said signal processing modules comprising hardware signal processing modules.

10. A method comprising:

providing transmit and receive circuitry for transmitting and receiving ultrasound signals; and providing a plurality of signal processing modules inline in a data stream receiving said ultrasound signals, said signal processing modules including input multiplexers adapted to control an order of processing by said plurality of signal processing modules.

11. A method in accordance with claim 10, said input multiplexers comprising bypass multiplexers for bypassing one or more of said signal processing modules.

12. A method in accordance with claim 11, said signal processing modules comprising nonlinear signal processing modules.

13. A method in accordance with claim 12, said nonlinear signal processing modules including at least one of log compress, decimation, compounding, blending, edge enhancement, automatic gain control, BHNS, lateral, or persistence filters amplitude data.

14. A method according to claim 13, said signal processing modules comprising hardware signal processing modules.

15. A method, comprising: providing a plurality of signal processing modules inline in a data stream receiving signals, said signal processing modules including input multiplexers adapted to control an order of processing by said plurality of signal processing modules.

16. A method according to claim 15, said input multiplexers comprising bypass multiplexers for bypassing one or more of said signal processing modules.

17. A method according to claim 16, said signal processing modules comprising nonlinear signal processing modules.

18. A method according to claim 17, said nonlinear signal processing modules including at least one of log compress, decimation, compounding, blending, edge enhancement, automatic gain control, BHNS, lateral, or persistence filters.

19. A method according to claim 18, said signal processing modules comprising hardware signal processing modules.

20. A method comprising:

receiving a plurality of data signals;

processing said data signals with a plurality of signal processing modules; and multiplexing inputs of said signal processing modules to arrange an order of processing.

21. A method according to claim 20, said multiplexing inputs comprising bypassing one or more of said signal processing modules.

22. A method according to claim 21, said signal processing modules comprising hardware signal processing modules.

23. A method according to claim 22, said signal processing modules comprising nonlinear signal processing modules.

* * * * *